Figure 1:
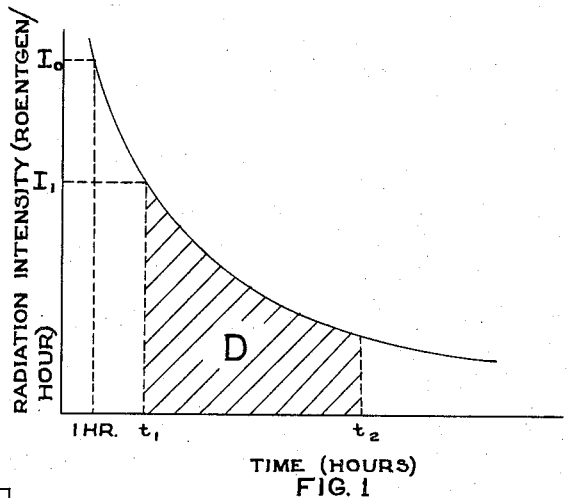

July 22, 1958   J. M. McCAMPBELL   2,844,312
RADIATION INTENSITY DOSAGE ANALOGUE COMPUTER
Filed April 16, 1953

INVENTOR
JAMES McCALL McCAMPBELL
BY
ATTORNEYS

United States Patent Office 2,844,312
Patented July 22, 1958

2,844,312

RADIATION INTENSITY DOSAGE ANALOGUE COMPUTER

James M. McCampbell, San Francisco, Calif., assignor to the United States of America as represented by the Secretary of the Navy Application April 16, 1953, Serial No. 349,328

2 Claims. (Cl. 235—61)

(Granted under Title 35, U. S. Code (1952), sec. 266)

This invention may be manufactured and used by or for the Government of the United States of America for governmental purposes without the payment of any royalties thereon or therefor.

This invention relates to computers, and more particularly to an analogue computer for solving problems involving radiation intensity dosage or permissible exposure times.

In work areas where contamination by radiation is suspected, there are several main and related considerations which always should be resolved either before personnel are permitted to enter, or after such personnel have been exposed for periods of time. Basically, the problem is the amount of radiation dosage to which exposed personnel either have been or will be subjected, but, as might be anticipated, this dosage, in turn, depends upon such other factors as the radiation intensity both at time of entry and of exit, as well as the length of the exposure time. Obviously, these factors are of prime interest in determining whether the area is safe for working or, in cases where there has been an exposure, whether precautionary medical treatment is required. Another frequently arising problem involves the length of time during which personnel can be permitted to work in a contaminated area without harmful effects, and again in this instance the factors of intensity and dosage are of primary concern. Thus for instance, if the maximum safe dosage is known and if the radiation intensity at time of entry also can be determined, the determination of permissible exposure time obviously admits to a mathematical solution. Also, if intensities at time of entry and exit, as well as the exposure period, are known, the determination of the dosage received should involve a related mathematical calculation.

A mathematical relationship or equation for the pertinent factors can be stated as follows:

$$(t_2{}^{0.2} - t_1{}^{0.2}) t_1 I_1 5 = t_2{}^{0.2} D$$

Where:

$t_1$ = time of entry
$t_2$ = time of exit
$I_1$ = Radiation intensity at time of entry
$D$ = Dosage received The function 0.2 is a mathematically determined value derived from the value 1.2 which expresses the rate of radiation decay and, accordingly logarithmically modifies the entry and exit time.

Obviously, such an equation is capable of being solved by many means, such as by graphs, mechanical calculators, or even straight mathematical calculations aided by the use of tables. However, such means all are relatively slow, laborious and even more important they each involve to varying degrees the services of an understanding and skilled worker. As a consequence, they have been found highly susceptible to errors, particularly when rapid calculations are being attempted, and, of course, such errors may have rather dire consequences.

A principal object of this invention is, therefore, to provide a computer capable of accurate use by unskilled personnel and also adapted for solving such problems in an unusually rapid manner.

Related objects are to provide such an apparatus which is simple to operate, not likely to be misinterpreted and one in which all the variables of the problems may be solved with equal facility.

Still other objects are to provide an electrically-energized analogue computer, the accuracy of which is unaffected by supply voltage variations and one that is capable of being initially balanced to accommodate varying supply sources.

These and other objects will become apparent from the accompanying detailed specification and drawing.

According to the invention the analogue computer is designed to solve equations having a plurality of variable terms, one of which may have an exponential function, such as the term $t_2{}^{0.2}$ in the equation described above. Preferably, each of the variable terms is represented in the computer by a potentiometer that is provided with a scale, and the potentiometers may be arranged with two branch circuits, each of which is connected across a null balance indicator, such as a galvanometer, and provided with an electrical power supply, such as a battery. With such an arrangement, the computer is capable of providing very rapid calculations for any of the unknowns. Thus, using the radiation equation already described, dosage can quickly be determined simply by imposing the known time of entry and exit values, as well as the intensity value, on the potentiometers of the computer. In such a problem, a suitable counter can be used to determine intensity.

The simplicity of the computer, however, is achieved through the use of potentiometers which either are tapered or are provided with a logarithmically-distorted scale such as permits the exponential values to be directly included in or imposed upon the computers circuits. Thus, the time of entry is included without regard to the radiation decay factor of 0.2 because the potentiometer is tapered or otherwise adapted to automatically modify the value by that function.

Another feature to be presently noted is that the computer mathematically simulates a balanced equation by including a power supply for each side of the equation, and, in addition, a separate circuit by means of which the two sides of the simulated equation can be initially balanced.

These circuits and other features of the invention will be fully described in the detailed description to follow.

The invention will be described with reference to the accompanying drawings in which Fig. 1 is a graph illustrating the variables present in radiological problems, and Fig. 2 the preferred wiring diagram for the analogue computer.

As previously stated, the present computer is primarily an analogue of a particular radiation equation so that this equation perhaps is of sufficient interest to merit a description of the manner in which it is derived. However, it should be clearly understood that there is no intent to limit the invention to this particular use.

Broadly, this "radiation" equation is an expression of the relationship demonstrated by the "time-intensity-dosage" curve shown in Fig. 1. The curve is determined by the basic time-intensity relationship expressed by the terms $I_1 = I_0 t_1{}^{-1.2}$, in which $I_0$ is a peak or infinity radiation intensity value (Roentgen/hour) which may be measured at a fixed time, such as one hour after an explosion; and $I_1$ another intensity value established at a predetermined subsequent time, or at $t_1$. Generally, the meaning of the expression $I_1 = I_0 t_1{}^{-1.2}$ is, that the intensity at a particular time is equal to the peak intensity modified by a radioactive fission decay factor (−1.2) which factor functions for a fixed period of time represented by $t_1$. Starting with this basic relationship, it then can be appreciated that the dosage integrated from a fixed time $t_1$ to infinity can be expressed as follows:

(1) $D_1 = I_0 t_1 t^{-1.2} dt$ which also can be restated as:
(2) $D_1 = I_0 O - t_1^{-0.2}$ But since $I_0 = I_0 = I_1 1.2$ then (3) $$D_1 = \frac{5 I_1 t_1^{1.2}}{t_1^{0.2}} = 5 I_1 t_1$$

(4) Similarly $D_2 = 5 I_2 t_2$
(5) Further, a dosage received between $t_1$ and $t_2$, or $D = D_1 - D_2$
(6) Substituting equivalents $D = 5(I_1 t_1 - I_2 t_2)$
(7) However, $I_2 = I_0 t_2^{-1.2} = I_1 t_1^{1.2} t_2 - 1.2$
(8) Substituting in Equation 6:

$$D = 5(I_1 t_1 - I_1 t_1^{1.2} t_2^{-1.2} t_2) = 5 I_1 t_1 \frac{t_2^{0.2} - t_1^{0.2}}{t_2^{0.2}}$$

Finally resolved $$(t_2^{0.2} - t_1^{0.2}) t_1 I_1 5 = t_2^{0.2} D$$

As previously noted, it is this final resolution or derivation to which the computer is analogous and the simplicity of the computer is due in part to the ability to solve this equation by the particular arrangement of electrical elements now to be described.

Figure 2:
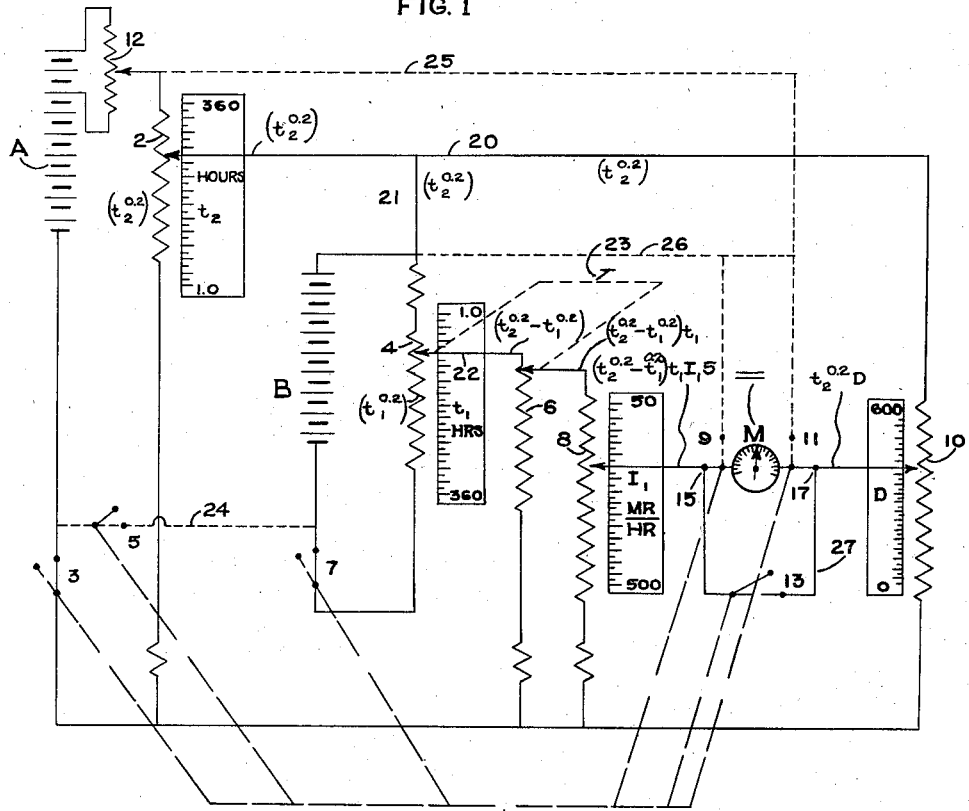

Fig. 2 shows the preferred wiring diagram of the computer which includes two electrical circuits, namely, an operating, or computing, circuit represented by solid lines and an adjusting circuit superimposed on the latter and represented by dashed lines; the former circuit being used for solving the problems and the latter circuit for balancing the electrical power supplies used in the computing circuit prior to its activation. The computing circuit comprises two similar branch circuits having direct current power supples A and B, which, preferably, are 15 volt batteries one being provided for each side of the above-derived equation.

$(t_2^{0.2} - t_1^{0.2}) t_1 I_1 = t_2^{0.2} D$. Also included is a null balance indicator, or galvanometer M, used in a manner to be described to indicate a balanced condition in the branch circuits, this indicator functioning as the electrical equivalent of the equal sign of the equation.

In branch circuit A, or in other words the branch circuit containing battery A, the negative side of the battery is grounded and connected in series with potentiometer 2 through a single pole switch 3, the potentiometer being provided with the customary movable slider or indicator arm capable of being selectively positioned with respect to the potentiometer resistance coil and representing, when so positioned, the variable, exponential term $t_2^{0.2}$ of the equation. The exponential function of this term may be produced either by tapering the winding of potentiometer 2 so that moving the pointer to a value of $t_2$ on the associated scale yields a voltage proportional to $t_2^{0.2}$ at the slider; or the same result may be obtained by combining a linear potentiometer winding with an indicator scale that is so distorted as to produce the exponential function. For definition purposes, when a potentiometer is non-linear, the winding may be tapered or the scale distorted, either construction providing the non-linear function.

In the distorted scale construction, the scale should be expanded in the region of greatest interest, which usually is the first 24 hours after the radiation release, while the remainder of the scale may be compressed progressively toward the upper limit. In either construction, a scale limit between 1 hour and 360 hours (15 days) has been found to be most appropriate.

Another point to note with respect to battery A is that its voltage output, after modification by the $t_2^{0.2}$ non-linear potentiometer 2 is conducted through a line 20 to the right side of indicator M, and in addition, through another line 21 to the B branch circuit.

The B branch circuit is identical to the A branch circuit in that its battery B is connected in series with its potentiometer 4 through a single pole switch 7. Also, potentiometer 4 is non-linear and is so designed that the voltage output of battery B is modified by a value proportional to the variable term $t_1^{0.2}$ of the equation. The exponential function of $t_1$ may be produced in the same manner as previously described with reference to $t_2$. As indicated above, batteries A and B may have a low voltage, and as will later be described, their arrangement in this computer permits their outputs to vary within definite limits without effecting the computer operation. As to potentiometers 2 and 4, it has been found that resistances of approximately 1000 ohms are satisfactory.

Referring back to the radiation equation, the first term involves a subtraction of the entry and exit time exponential values, i. e. $(t_2^{0.2} - t_1^{0.2})$, and this is accomplished in the present computer circuit by connecting battery B in what might be called a "floating" manner. Thus, it should be noted that battery B is not grounded, as is battery A, so that, accordingly, the positive terminal of B always assumes the same voltage with respect to ground as the slider of potentiometer 2. As a result, the slider of potentiometer 4 always is more negative than the positive terminal of battery B, so that its voltage with respect to ground corresponds to the expression $(t_2^{0.2} - t_1^{0.2})$. It is further noted that, although the scale of potentiometer 4 extends to the same limits as the scale of potentiometer 2, the former is inverted with respect to the latter. Since $t_2$ is necessarily larger than $t_1$ the voltage representing $(t_2^{0.2} - t_1^{0.2})$, carried through a line 22, always is algebraically positive.

Line 22, as may be seen, carries the positive value $(t_2^{0.2} - t_1^{0.2})$ to potentiometers 6 and 8, the functions of which are to multiply the value by the terms $t_1$ and $I_1$. To accomplish this, it is necessary only to so arrange the shafts of the potentiometer sliders so that their rotations are proportional to the variables $t_1$ and $I_1$, the constant 5 of the equation being absorbed in the scale calibration of potentiometer 8. Preferably, potentiometer 8 has a resistance of 100 kilo ohms and is scaled between 50 and 500 r (Roentgen) per hour, while potentiometer 6 has a resistance of 10 kilo ohms. Also, if potentiometer 4 is linear with distorted scales, then potentiometer 6 must be tapered to compensate for the distortion of the scale, since the sliders of potentiometers 4 and 6 are coupled as at 23. This coupling may consist of a pair of pinion gears causing the shafts of these two potentiometers to rotate in opposite directions. Of course, the arrangement of potentiometers 6 and 8 does not actually multiply but the voltage at the slider is proportional to the input voltage and the rotation of the shaft. Thus a voltage is introduced to the left side of the meter through a switch 15 that is proportional to the left side of the analogue equation $(t_2^{0.2} - t_1^{0.2}) 5 t_1 I_1$.

Referring back to the so-called "A" circuit, the voltage proportional to $t_2^{0.2}$ in line 20 from potentiometer 2 is applied to linear potentiometer 10 whose shaft rotation is proportional to dosage D, so that the voltage directed to the right side of the meter M through switch 17 corresponds to and is proportional to the right side of the analogue equation, $t_2^{0.2} D$. Most suitably, potentiometer 10 is formed with a resistance of 100 kilo ohms, and a scale reading from 0 to 600 Roentgens. At a null condition of the meter, the mathematical relations imposed by the analogue equation are fulfilled and the values of all the variables are indicated by the sliders or pointers of the respective potentiometer scales.

Prior to operation of the computer, the electric power supplies (batteries A and B) must be balanced and for this purpose an additional balancing or adjusting circuit is provided, this circuit connecting the negative terminals of the batteries by dashed line 24 containing a single pole switch 5 and connecting the positive sides of the batteries across the meter by dashed lines 25 and 26, switches 11 and 9 being provided to connect these lines across the meter.

To balance the power supplies, switches 3, 7, 15 and 17 are opened and the switches 5, 9 and 11 are closed, this operation placing the batteries directly across the meter with their voltages in opposition.

Any unbalance in the two battery voltages, as indicated on the meter, may be remedied by adjusting the potentiometer 12 connected to battery A until a null condition is achieved. During adjustment of the supply voltages or the operation of the computer, switch 13 in line 27 is open, and it is closed only when the computer is not in use. With switch 13 closed, line 27 shunts the meter to dampen any violent movement of the meter needle that otherwise might be induced. Manual operation of the switches may be simplified by ganging as at 29, using one switch with three positions, i. e. off, on and adjust, and five circuits so that only one movement may actuate all switches.

After the supply voltages are balanced, the computing circuit may be energized by reversing the position of the switches, that is, switches 3, 7, 15 and 17 are closed, and switches 5, 9, 11 and 13 are opened. Values for the radiation intensity at the time of entry ($I_1$), the entry time ($t_1$) and the exit time ($t_2$) are applied to the potentiometers by setting the respective pointers on the scales at the proper positions. The meter then is balanced with the D pointer on potentiometer 10 and the value of the dosage is read from the scale. Similarly, the equation can be solved for any one of its variables providing the remaining variables are known, and the manner in which such other operations would be conducted should be obvious from the foregoing description.

As now can be appreciated, the invention provides a computer which will solve problems where there is a plurality of variable terms, at least one of which has an exponential function. While this computer is particularly suited to solve radiological problems, it also should be clear that it is not so limited. The component parts of the circuits are simple and inexpensive electrical elements, eliminating the necessity of electronic valves such as tubes, etc., which are expensive and fragile. Further, the computer is durable and light-weight and so as to be easily carried by the user ready for use as the occasion arises.

Obviously, many modifications and variations of the present invention are possible in the light of the above teachings. It is, therefore, to be understood that within the scope of the appended claims the invention may be practiced otherwise than as specifically described.

I claim:

1. An analogue computer for use in solving radiation problems inherent in the equation $$(t_2^{0.2}-t_1^{0.2})t_1I_15=t_2^{0.2}D$$

in which $t_1$ is time of entry, $t_2$ is time of exit, $I_1$ is radiation intensity at $t_1$, and D is the dosage received; said computer including null balance indicating means, a grounded direct-current power supply, a manually-settable non-linear potentiometer having one end electrically coupled to the positive side of the battery and the other end grounded, a second direct-current power supply, a second manually-settable non-linear potentiometer having one end electrically connected to the positive side of said power supply and the other end electrically connected to the negative side of said power supply whereby said second power supply is floating with respect to ground, a slider arm for each of said first and second potentiometers, a multiplying circuit electrically connected between said second slider arm and said null balance indicating means, a third potentiometer having one of its ends grounded and its opposite end electrically connected to said first potentiometer slider arm, a slider arm for said third potentiometer, and an electrical conduit connecting said third potentiometer slider arm to said null balance indicating means, said out-puts of said multiplying circuit and said third potentiometer slider arm being electrically fed into opposite sides of said null balance indicating means whereby said means indicates a null balance when said out-puts are equal in amount, said out-put of said first potentiometer slider arm being electrically coupled to said second potentiometer at the end connected to said second power supply positive side whereby said floating property of said second power supply electrically accomplishes the subtraction term of the equation, said subtraction then being applied by said second slider arm to said multiplying circuit the product of which is fed into said null balance indicator, and said $t_2^{0.2}D$ term of the equation being electrically produced by feeding said out-put of said first potentiometer slider arm into said third potentiometer, said non-linear properties of said first and second potentiometers being determined in accordance with the exponential values of the equation, and said third potentiometer being proportioned to dosage, whereby any term of the equation can be ascertained from a particular slider arm reading by setting the other slider arms at known values and manipulating said particular slider arm to obtain a null condition at said null balance indicator.

2. A computer according to claim 1, said computer including a balancing circuit for said power supplies.

References Cited in the file of this patent

UNITED STATES PATENTS 2,466,879   Doba _____ Apr. 12, 1949